United States Patent [19]

Megory-Cohen

[11] Patent Number: 5,357,623
[45] Date of Patent: Oct. 18, 1994

[54] DYNAMIC CACHE PARTITIONING BY MODIFIED STEEPEST DESCENT
[75] Inventor: Igal Megory-Cohen, Givat Ela, Israel
[73] Assignee: International Business Machines Corporation, Armonk, N.Y.
[21] Appl. No.: 786,490
[22] Filed: Nov. 1, 1991
[51] Int. Cl.$^5$ .............................................. G06F 12/08
[52] U.S. Cl. ............................. 395/425; 364/DIG. 2; 364/967.4
[58] Field of Search ........................................ 395/425; 364/200 MS File, 900 MS File

[56] References Cited

U.S. PATENT DOCUMENTS

| | | | |
|---|---|---|---|
| 4,463,424 | 7/1984 | Mattson et al. | 364/300 |
| 4,503,501 | 3/1985 | Coulson et al. | 364/300 |
| 4,947,319 | 8/1990 | Bozman | 364/200 |
| 5,043,885 | 8/1991 | Robinson | 395/425 |
| 5,075,868 | 12/1991 | Andes et al. | 395/23 |

OTHER PUBLICATIONS

"Allocation of Cache Memory Among Competing Processes", IBM Technical Disclosure Bulletin, vol. 31 No. 9, Feb. 1989, pp. 204–209.
*Computational Structures;* Ward et al.; McGraw-Hill Book Company, New York, 1990; pp. 480–482.

*Primary Examiner*—Joseph L. Dixon
*Assistant Examiner*—Michael Tall
*Attorney, Agent, or Firm*—R. Bruce Brodie

[57] ABSTRACT

Dynamic partitioning of cache storage into a plurality of local caches for respective classes of competing processes is performed by a step of dynamically determining adjustments to the cache partitioning using a steepest descent method. A modified steepest descent method allows unpredictable local cache activities prior to cache repartitioning to be taken into account to avoid readjustments which would result in unacceptably small or, even worse, negative cache sizes in cases where a local cache is extremely underutilized. The method presupposes a unimodal distribution of cache misses.

3 Claims, 3 Drawing Sheets

DYNAMIC CACHE PARTITIONING BY MODIFIED STEEPEST DESCENT

TECHNICAL FIELD OF THE INVENTION

The present invention relates to a data processing system comprising cache storage and a cache manager providing dynamic partitioning of the cache storage.

DESCRIPTION OF RELATED ART

In a data processing system in which cache storage is shared between multiple processes and at any given time each process can be categorized into one of n classes according to its projected cache behavior, it can be advantageous to partition the cache into pools, where each of the pools is allocated to a respective class of processes, rather than the processes sharing a global cache. Where a cache is divided into a number of pools, the question arises of how to determine the size of the pools so as to obtain full benefit from the provision of pools.

Cache storage can be used in many applications. Examples are data caches, control unit caches, translation lookaside caches. The invention relates to any kind of cache for which more than one type of process compete. The meaning of the term "process" is specific to the type of cache considered. For example, in a control unit cache, "process" might mean an application accessing the disks.

Suppose that a cache C is used by competing processes and that at any given time each process can be categorized into one of n classes $Cl_1, \ldots, Cl_n$ where processes that belong to the same class are likely to exhibit similar cache behavior. For example, in the case of a data cache, all tasks accessing a file sequentially could be naturally categorized as belonging to the same class. The cache entries can thus be partitioned at any given time into n subsets $C_1, \ldots, C_n$. The subset $C_i$ represents all entries last referenced by processes of class $Cl_i$. When each subset $C_i$ is being managed separately, as if it were a separate cache, it is referred to as a "cache pool". As mentioned above, it is usually advantageous to partition the cache into n pools, rather than share a global cache.

Two approaches to the partitioning of a cache are described in an article entitled "Allocation of Cache Memory among Competing Processes" which appeared in the IBM Technical Disclosure Bulletin, Volume 31, No. 9 of February 1989 at pages 204 to 209. Both approaches deal with the optimal fixed allocation of cache among two or more processes; i.e. how to divide a cache among competing processes once the processes have reached a steady state. Both approaches require knowledge of the miss ratio function for each process for all possible cache sizes. In other words, these approaches require the knowledge of each cache pool behavior for all possible cache sizes making them inapplicable to the dynamic case. However, in practice, the usage of cache storage is not always static. What is required is a dynamic solution to the partitioning of cache to take account of a population of processes and a cache usage or cache behavior, which can be continuously changing.

U.S. Pat. No. 4,463,424 relates to an approach to the dynamic allocation of LRU/MRU managed memory among concurrent sequential processes using a trace of I/O references. The method comprises mapping items in groups of pageable data into an LRU stack partitioned into a relatively small number (p+1) of equivalence classes such that all items in the same class have the same stack distance. The selection of cache sizes is made from only a small set (p) of possible cache sizes.

SUMMARY OF THE INVENTION

It is an object of this invention to devise a method and means for dynamically managing cache partitioning among a plurality of processes executing on a computing system.

It is a related object that such a method and means be continuously adjustable and select from among a large set of possible cache partition sizes.

In accordance with a first aspect of the present invention therefore, there is provided, in a data processing system comprising cache storage and a cache manager, a method of dynamically partitioning the cache storage into a plurality of cache pools for respective classes of processes, comprising the step of dynamically determining adjustments to the cache partitioning using a steepest descent method.

The steepest descent method is a specific iterative minimization technique of a type widely described in general terms in the literature, for example in the books "A Vector Space Approach to Models and Optimization" by C. Nelson Dorny, published by John Wiley and Sons, New York, US in 1975 (see pages 487 to 501) and "Linear and Nonlinear Programming", by David G. Luenberger, published by Addison-Wesley Publishing Company, California US in 1984 (see pages 214 to 220). Although the use of the steepest descent approach is widely described in the literature, its use has not heretofore been suggested for the partitioning of cache storage. The use of the steepest descent method provides significant advantages over prior approaches to the partitioning of cache storage. Specifically, it provides for the efficient partitioning of cache dynamically, even for large numbers of cache pools.

The approach adopted in U.S. Pat. No. 4,463,424, is only practical for a small number of cache pools. This is because this prior approach requires movement, alteration or scanning 2p+1 items per referenced item and the complexity of cache partitioning is $(p+1)q$ (to the power q) where p is the number of possible cache sizes and q is (in our terminology) the number of cache pools. A 64M data cache where each cache frame is 4K (a typical example) and 3 pools would be of complexity equal to $(16K)3 = 4096$ billion operations. In this prior approach the updating of p entries per cache reference is unacceptable except for small p. The storage required for the control structure of this prior approach is large, namely p*q.

By comparison, the use of a method of steepest descent enables a complexity of only q*q (9 in the above example) to be achieved for cache partitioning, with only 2 fields (fields for the number of references $f_i$ to the cache pool and for the number of references which result in a cache miss $m_i$) being updated per referenced item. The method of the invention does not put a limit on the number of possible cache sizes. The size of storage for the control structure required for the present invention is proportional to q.

The step of dynamically determining adjustments to the cache partitioning using a steepest descent method preferably comprises iteratively performing the steps of: (a) tracking, for each cache pool, the number of references to the cache pool and the number of references which result in a cache miss; and (b) determining adjustments to the cache partitioning by determining, for a weighted miss ratio function, subject to the constraint that the sum of the individual cache sizes equals the total cache size, a vector in the direction of the steepest descent projected on a functional hyperplane representative of said constraint.

Preferably, step (a) comprises maintaining a control block for each cache pool having a first data field and a second data field, the content of the first data field being incremented on each access to that cache pool and the content of the second data field being incremented each time such an access results in a cache miss.

Preferably, in at least certain iterations, step (b) comprises sub-steps of: (b)(i) determining which cache pools have sizes which are not smaller than respective predetermined sizes; (b)(ii) for the sub-set of cache pools determined in step (b)(i) only, determining, for a weighted miss ratio function, subject to the constraint that the sum of the individual cache sizes equals the total of the sizes of cache pools of the sub-set, a vector in the direction of the steepest descent projected on a functional hyperplane representative of said constraint; and (b)(iii) if the cache pool sizes of the sub-set of cache pools all are not smaller than respective predetermined sizes, then terminate step (b); otherwise repeat steps (b)(i) to (b)(iii) recursively for a new sub-set of cache pools.

In accordance with a second aspect of the present invention, there is provided a cache storage system comprising cache storage and a cache manager for dynamically partitioning the cache storage into a plurality of cache pools for respective classes of processes, wherein the cache manager comprises steepest descent logic for determining adjustments to the cache partitioning dynamically using a steepest descent method.

The invention also provides a data processing system comprising a cache storage system as defined above. The data processing system can be a mainframe computer system, a computer workstation, or any other data processing system in which a plurality of processes compete for use of a cache storage.

DESCRIPTION OF THE PREFERRED EMBODIMENT

Figure 1:
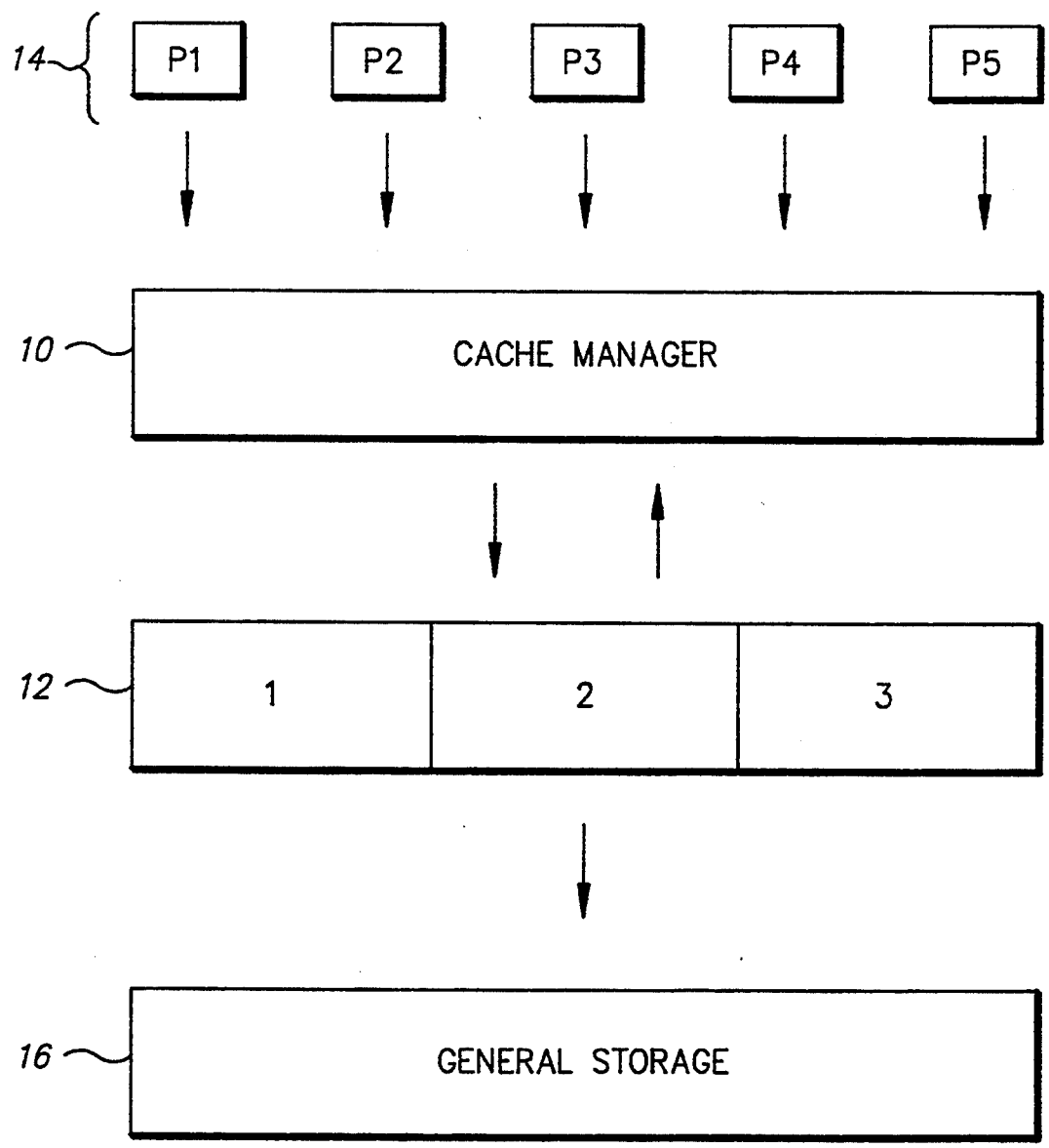
FIG. 1 is a schematic block diagram representative of a partitioned cache storage system.

Referring to FIG. 1, the present invention can be applied generally to cache storage system where a cache manager 10 arranges for a cache 12 to be partitioned into a plurality of cache pools 1, 2, 3 for sharing between a plurality of competing processes 14. Between the cache manager and the processes, there will usually be another level of logic in the form of a file management system or a data base management system (DBMS), not shown. However, it is assumed herein that the reader is familiar with the use of and the conventional management of cache memory for speeding access to data normally held in general (i.e. main or backing storage) 16. Accordingly, no further description of this general background is given herein.

The cache storage system can form part of a data processing system. The data processing system can be a mainframe computer system, a computer workstation, or any other data processing system in which a plurality of processes compete for use of a cache storage. The following description concentrates on the application, in accordance with the invention, of the method of steepest descent to the partitioning of cache storage. In the following "c" denotes the size of cache 12 and similarly "$c_i$" denotes the size of cache pool i.

Figure 2:
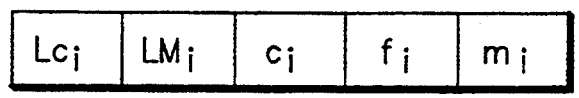
FIG. 2 is a schematic diagram of a cache pool control block.

Among the tasks of a traditional cache manager, is the monitoring of the usage of the cache. In the present case, for a given cache partitioning $c = c_1 + \ldots + c_n$, the cache manager maintains a control block for each cache pool. FIG. 2 illustrates such a control block. It contains the following fields:

Last_Pool_Size $Lc_i$
Last_Miss_Ratio $LM_1$
Current_Pool_Size $c_i$
Current_Pool_References $f_i$
Current_Pool_Misses $m_i$ The control block can be held in general purpose storage of the data processing system in which the cache storage system operates. Alternatively, it can be provided in the form of special purpose storage.

Figure 3:
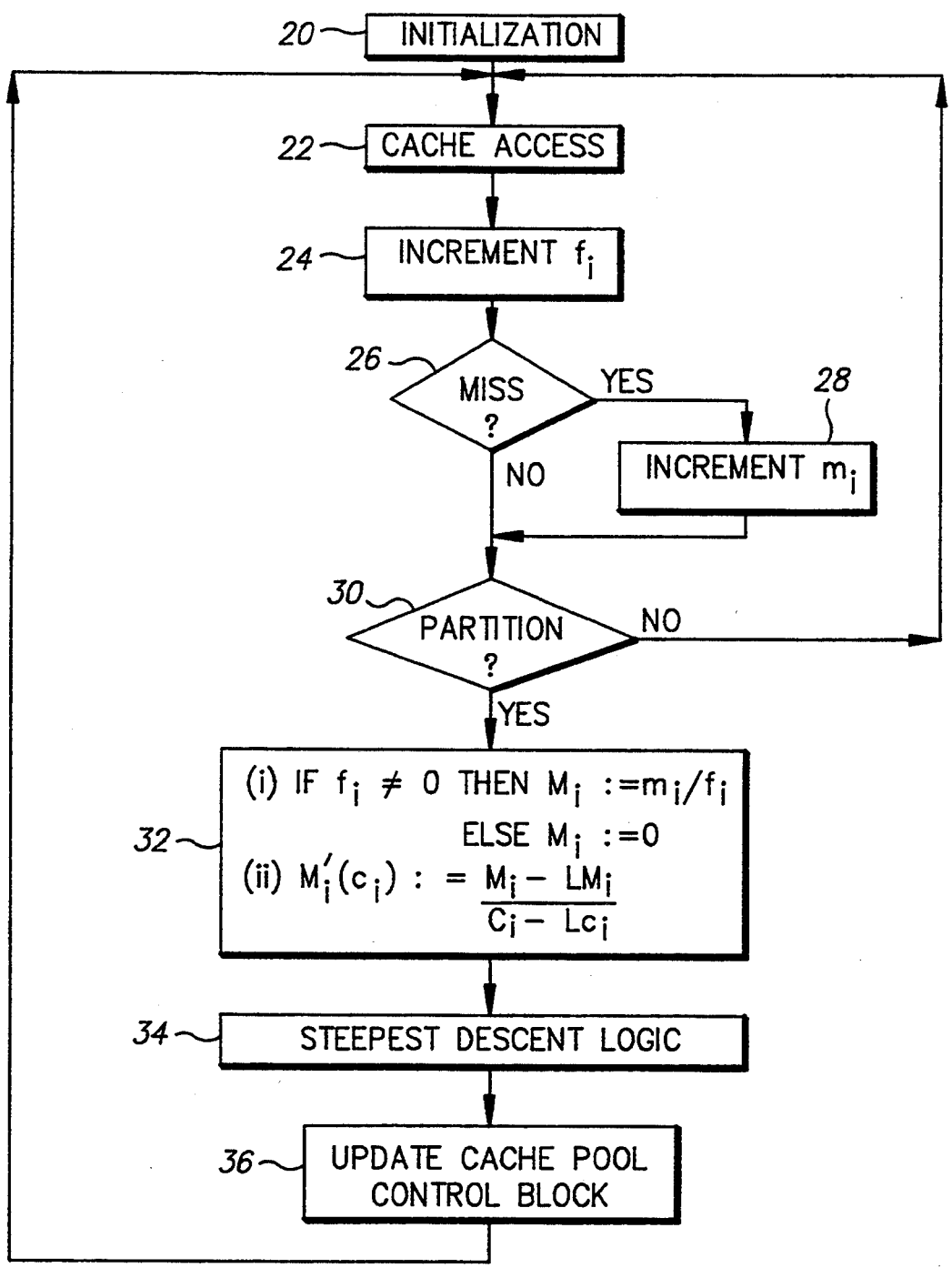
FIG. 3 is a flow diagram illustrating the dynamic partitioning of cache in accordance with the present invention.

FIG. 3 is a flow diagram illustrating operations of control logic incorporated in the cache manager for providing dynamic management of cache partitioning in accordance with a steepest descent method. In a preferred embodiment, this logic is provided in the form of software held in the storage of data processing system and controlling the operation of the system's processor or processors. However, the logic could also be provided, at least in part, in the form of hardwired logic.

During cache initialization, the control logic 20 zeros the fields indicated above, with the exception of the field for the Current_Pool_Size, in the control block for each of the cache pools. The field for the Current_Pool_Size is set to c/n (c being the total cache size and n being the number of cache pools). Note that within each control block, the content of the Last_Pool_Size must be different from the Current_Pool_Size as will become apparent later. During operation of the cache, the control logic monitors 22 each access to the cache.

The control logic increments 24 the content of the Current_Pool_References data field for the cache pool accessed. In addition, if 26 the access to that cache pool results in a cache miss (i.e. the item accessed is not held in the cache pool), the cache manager increments 28 the content of the Current_Pool_Misses data field.

The control logic repeats the functions of blocks 24 to 28 until 30 cache repartitioning is to be performed. The repartitioning can be performed at intervals which are chosen to be appropriate for the application. For example, repartitioning could be performed after a predetermined number of cache accesses, or cache misses, from one upwards, or at predetermined time intervals, or in response to an external interrupt. When cache partitioning is to be performed 30, the control logic performs 32 the following operations for each of the cache pools:

(i) The Current_Miss_Ratio ($M_i$) for each cache pool which has been referenced is computed to be the content of the Current_Pool_Misses field ($m_i$)

divided by that of the Current_Pool_References field ($f_i$) unless the pool concerned has not been accessed (i.e. $f_i=0$) in which case it is set to zero.

(ii) The derivative of the Current_Miss_Ratio for each cache pool with respect to the size of that cache pool $M_i'(c_i)$ is computed to be the difference of the computed value of the Current_Miss_Ratio ($M_i$) and content of the Last_Miss_Ratio ($LM_i$) field divided by the difference between the content of the Current_Pool_Size ($c_i$) and Last_Pool_Size ($Lc_i$) fields.

The control logic includes steepest descent logic 34, which then computes a new cache partitioning on the basis of the above data, the result of which is the New_Pool_Size ($Nc_i$) for each cache pool. The application of the method of steepest descent to the partitioning of cache will now be described in more detail.

Figure 4:
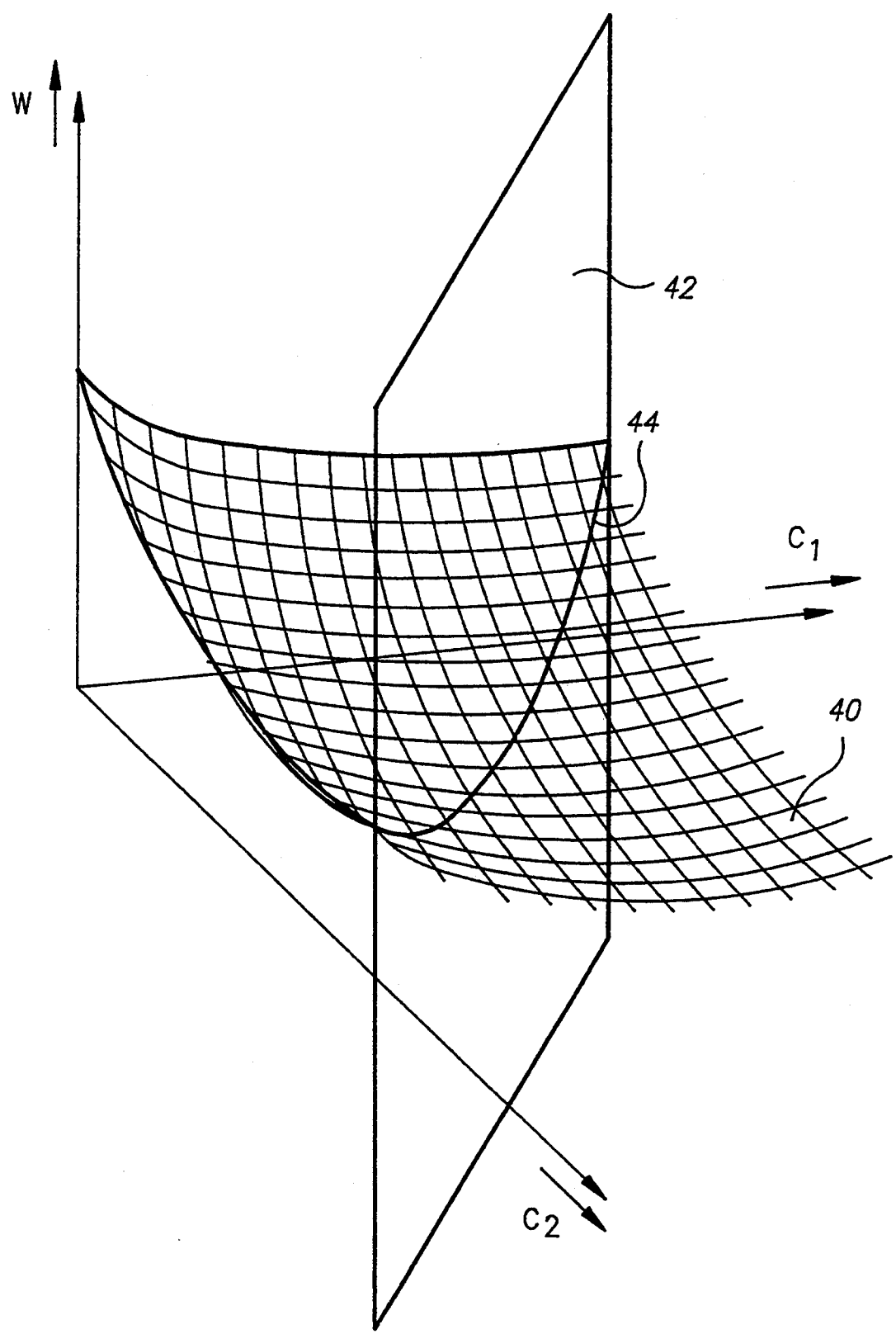
FIG. 4 is a schematic diagram used for explaining the method of steepest descent.

The best use of the cache can be represented by the minimum of a weighted miss ratio function $w=\Sigma F_i M_i(c_i)$ subject to the constraint $\Sigma c_i=c$. $F_i$, the frequency of references to the cache pool i, is determined to be the current content of the Current_Pool_References field ($f_i$) divided by the total number of references to the cache ($\Sigma f_i$). FIG. 4 illustrates a situation where there are two cache pool sharing sizes $c_1$ and $c_2$, respectively. The weighted miss ratio function w can then be represented by a surface 40, with the constraint represented by a constraint plane 42, which intersects the surface 40 at 44. FIG. 4 relates to a situation where n=2 for reasons of ease of illustration. It will be appreciated, however, that the invention is applicable to and indeed is primarily intended for greater numbers of cache pools (i.e. for n greater than 2).

In order to adjust the cache partitioning so as to tend toward an optimum use of the cache, the method of steepest descent moves in the direction of the projection of the steepest descent onto the constraint hyperplane, $\Sigma c_i=c$.

If the normal to the constraint hyperplane is denoted by a vector r, then:

$$\text{vector } r=(1/\sqrt{n})(1,\ldots,1)$$

and the direction of the steepest descent is given by:

$$\text{vector } s=(-F_1 M_1'(c_1),\ldots,-F_n M_n'(c_n)).$$

The projection of the steepest descent onto the constraint hyperplane is then given by:

$$(\delta c_1,\ldots,\delta c_n)=\text{vector } s-(\text{vector } s\cdot\text{vector } r)\text{vector } r$$

Computing the i-th component of this vector yields, $$\delta c_i = 1/n \Sigma F_j M_j'(c_j) - F_i M_i'(c_i).$$

The $\delta c_i$ values define the changes to the sizes $c_i$ of each of the cache pools. The New_Pool_Size ($Nc_i$) for each of the cache pools i is, therefore, calculated as:

$$Nc_i = c_i + \delta c_i$$

Note that the delta change vector satisfies $\Sigma \delta c_i = 0$ which means that the readjusted pools indeed satisfy $\Sigma c_i = c$.

The control logic 36 updates the cache pool control block for each cache pool as follows:

Last_Pool_$Size$ $(Lc_i)$ is set to the Current_$Pool$_$Size$ $(c_i)$ if that is different from the New_Pool_Size, otherwise it is left unchanged;

Last_Miss_Ratio ($LM_i$) is set to the Current_Miss_Ratio ($M_i$) if the Current_$Pool$_Size ($c_i$) is different from the New_Pool_Size, otherwise it is left unchanged;

Current_Pool_Size ($c_i$) is set to the New_Pool_Size ($Nc_i$);

Current_Pool_References ($f_i$) is set to zero;

Current_Pool_Misses ($m_i$) is set to zero.

Note that the updating of the Last_Pool_Size, if required, has to be done such that it uses the old value of the Current_Pool_Size so that the content of these two fields is kept different.

The result of applying the method of steepest descent as described above is the adjusted cache pool sizes for the set of cache pools.

In a further refinement of the steepest descent logic 36 above, unpredictable cache pool activities prior to cache repartitioning can be taken into account. The modified steepest descent approach described below, can avoid readjustments which would be too large resulting in unacceptably small or, even worse, negative pool sizes in cases where a cache pool is extremely underutilized.

If $I=\{1,\ldots,n\}$ is the initial set of cache pools, c the total size of the cache 12 and $c=c_1+\ldots+c_n$ for a given cache partitioning such that the i-th pool's size $c_i$ is no smaller than some non-negative threshold $t_i$, then procedure A, described below, constructs a subset $I'\leq I$ such that the method of steepest descent applied to the cache defined by $\{Ci\}_{i\in I'}$ yields a delta change vector $(d_{I'}(i))_{i\in I'}$ satisfying:

1. $\Sigma dI'(i)=0$, $i\in I'$
2. $c_i+d_{I'}(i)$ greater than or equal to $t_i$ for all $i\in I'$. Once the subset $I'$ has been constructed, readjustment is only applied to the pools $\{C_i\}_{i\in I'}$ according to the assignment:

$$C_i \text{ becomes } c_i+d_{I'}(i).$$

To simplify notation in the following for constructing $I'$, the following notations are used: Let g(i) be the function defined on I by the formula $$g(i)=F_i M_i'(c_i)$$

For each non-empty subset $J\leq I$ let dJ be the function defined on J by the formula $$d_J(j) = |J|^{-1} \sum_{k\in J} g(k) - g(j).$$

The following procedure A can be used to construct the subset $I'$:

$I':=I$ done:=false while (not done) compute $dI'$
$K:=\{i\in I'[c_i+dI'(i)<t_i\}$ if $(K=0)$ then $I':=(I'-K)$ else (done:=true) end As $c_i$ is no smaller than $t_i$ for all $i\in I$, before the application of procedure A, and as $\Sigma d_{I'}(i)=0$, K is a proper subset of $I'$ and $I'$ therefore would never be empty at the termination of the algorithm. Thus Procedure A constructs a subset of the set of all cache pools on which the method of steepest descent is applied and causes the sizes of those cache pools that are already small enough not to be further adjusted. This enables the size of cache pools to be constrained to be no smaller than given thresholds. It ensures also that only cache pools with non-negative sizes are generated.

The method of steepest descent is applied on the subset of cache pools constructed by Procedure A. Because the algorithm is efficient, it is ideally suited to dynamic systems. As mentioned above, the invention can be applied to all types of cache for which more than one type of process compete. The examples below are only a choice list of cache types that can use the dynamic readjustment feature of this invention. The dynamic nature of this invention is what makes the implementation of cache partitioning possible in the following examples.

Data Cache

This type of cache is stored in real memory or expanded storage and is normally managed by a file management subsystem or a DBMS. A process, in this example, represents a task accessing a file. Processes can be differentiated by their cache behavior (e.g. sequential versus random access pattern) and the data cache can be accordingly partitioned into cache pools. Dynamic readjustment of cache pools would enable the cache to respond smartly to changing activity in the system (e.g. the start of an I/O intensive batch job accessing a long file randomly).

Table Lookaside Cache

In virtual storage system, a lookaside table can be employed to containing virtual-to-real translations. This lookaside table can be configured as a cache containing all possible virtual-to-real translations. Each entry in such a table lookaside cache could, therefore, contain the resolution of a large portion of contiguous virtual external storage into real external storage addresses. A miss into the table lookaside cache could result in one or more I/Os whose sole purpose is to get virtual-to-real resolutions from directories and hence the importance of wise table management. In such a system, a collection of user defined disks can be considered as a continuous storage backing medium for virtual external storage.

Control Unit Cache

The cached control unit could be a 3990 controller for a 370/ESA computer or a disk controller for a smaller computer. The control unit has a cache which stores images of data residing on disks attached to it. Today, all disks share a common pool. With the application of this invention, the cache would be partitioned into several pools whose sizes would be changed dynamically. A cache pool could be designed to serve one or more disks.

The application of a method of steepest descent to the dynamic partitioning of cache has been described. If cache behavior is relatively stable, then this method will rapidly converge to the best partitioning when applied repetitively. The modified method of steepest descent, in particular, tends to improve cache partitioning based on the recent cache history. It moves in the direction of maximum benefit. This application of a method of steepest descent leads to an efficient implementation of dynamic cache partitioning. The calculations to be performed are simple and short, and as dynamic input, the method only requires the tracking of references and misses for each cache pool. The method is independent of the cache management algorithm employed (e.g. LRU/MRU). Indeed, different cache pools can even be managed by different cache management algorithms. Adjustment of cache pool sizes in accordance with the invention is a dynamic procedure. Dynamic readjustment of cache pools lets the cache react wisely to changes in cache activity by giving more cache resource to processes that use the cache more successfully on the expense of processes that do not use the cache as well. Cache pools are readjusted in such a way that overall hit ratio should increase in the near future.

By the use of procedure A, cache pool sizes can be kept above certain thresholds at all times. This approach is advantageous in cases where certain cache activities are always to be anticipated. For example, a designer can opt to always keep the size of a system data cache pool above a certain threshold. It will be appreciated that modifications and additions are possible to the examples of the invention described above within the scope of the attached claims.

We claim:

1. In a computer system comprising a CPU, a storage subsystem attaching said CPU, and a cache intercoupling said CPU and subsystem, said cache being initially partitioned into a plurality of local caches, each local cache i being of size $Lc_i$ and being subject to a miss ratio of $LM_i$, a method for dynamically adjusting the partition of said local caches referenced by counterpart classes of CPU executed processes, comprising the iterative steps of (a) tracking, for each local cache (i) of current size $c_i$, the number of current references ($f_i$) to said local cache and the number of current references ($m_i$) which result in a cache miss, the number of cache misses $m_i$ from each of the tracked local caches being distributed over a unimodal surface; and (b) adjusting local cache sizes $c_i$ for a weighted miss ratio function ($w=\Sigma F_i*M_i(c_i)$) as a vector in the direction of the steepest descent projected on a functional hyperplane representative of a constrained sum of individual cache sizes intersecting the unimodal surface, where $F_i=f_i/\Sigma f_i$, $M_i(c_i)=-m_i/f_i$.

2. The method according to claim 1, wherein step (a) includes the sub-steps of (a1) maintaining a control block for each local cache (i), said control block having a first data field for storing $f_i$ and a second data field for storing $m_i$; and (a2) incrementing the content of the first data field on each reference to that local cache and the content of the second data field being incremented each time such a reference results in a cache miss.

3. The method according to claim 1, wherein step (b) includes the sub-steps of (b1) determining which local caches have sizes $c_i$ which are not smaller than respective predetermined sizes ($t_i$);

(b2) for the sub-set of local caches determined in step (b1) only, determining, for a weighted miss ratio function ($w=\Sigma F_i*M_i(c_i)$) subject to the constraint that the sum of the individual cache sizes ($\Sigma c_j$, j ranges over the subset) equals the total of the sizes ($\Sigma c_i$) of local caches of the sub-set, a vector in the direction of the steepest descent projected on a functional hyperplane representative of said constraint; and (b3) terminating step (b) if the cache sizes $c_j$ of the sub-set of local caches are not smaller than respective predetermined sizes $t_i$, otherwise repeat steps (b1) to (b3) recursively for a new sub-set of local caches.

* * * * *

UNITED STATES PATENT AND TRADEMARK OFFICE
CERTIFICATE OF CORRECTION

PATENT NO. : 5,357,623
DATED : October 18, 1994
INVENTOR(S) : Megory-Cohen

It is certified that error appears in the above-indentified patent and that said Letters Patent is hereby corrected as shown below:

Column 4, line 20, delete "$LM_1$", insert-- $LM_i$ --.

Column 5, line 10, delete "$Pool_{13}$", insert-- $Pool_{\_}$ --.

Column 6, line 1, delete whole line, insert --Last_Pool_Size ($Lc_i$) is set to the Current_Pool_Size($c_i$) --.

Column 6, line 5, delete "$\_Pool\_$", insert--$\_Pool\_$--.

Signed and Sealed this

Fifteenth Day of August, 1995

Attest:

BRUCE LEHMAN

Attesting Officer       Commissioner of Patents and Trademarks